Oct. 18, 1955  R. E. REEVE  2,720,837
SHUT-OFF FOR CONTINUOUS MILKING SYSTEMS
Filed Aug. 4, 1952  2 Sheets-Sheet 1

INVENTOR
ROBERT E. REEVE
BY
Webster & Webster
ATTY'S

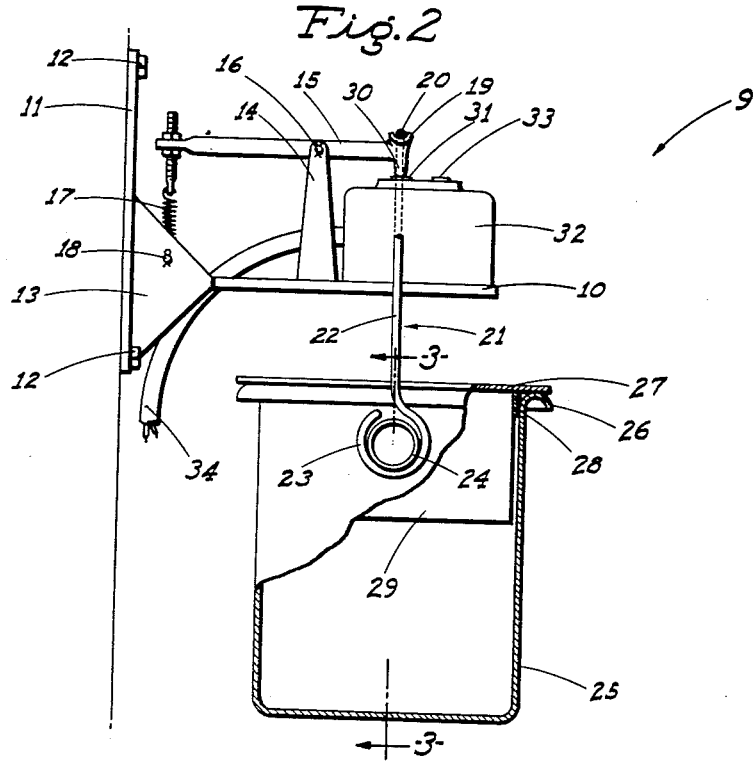
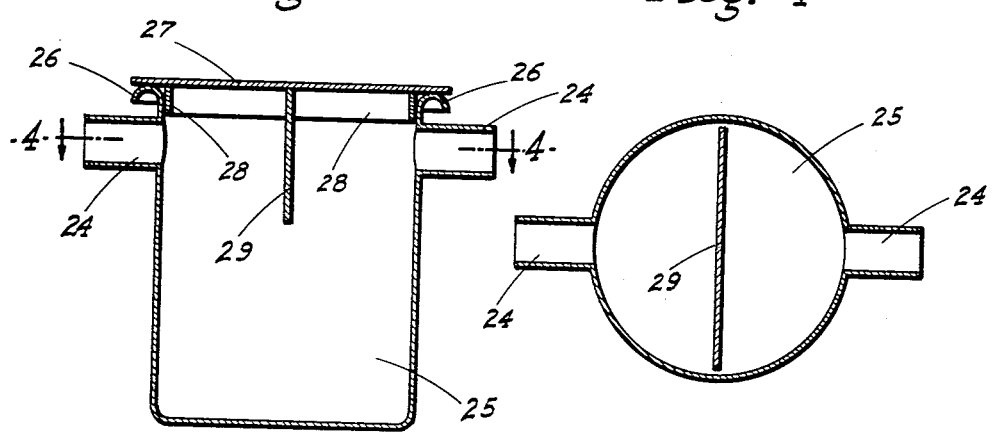

United States Patent Office 2,720,837
Patented Oct. 18, 1955

2,720,837

SHUT-OFF FOR CONTINUOUS MILKING SYSTEMS

Robert E. Reeve, Tracy, Calif.

Application August 4, 1952, Serial No. 302,464

2 Claims. (Cl. 103—25)

This invention relates in general to improvements in continuous or pipe-line type milking machines or systems; i. e. wherein the milk flows from each teat cup assembly through a connected transfer or pail unit suspended from the cow, and thence transfers by hose to a pipe line wherein the milk delivers—by vacuum—to a releaser, which in turn discharges into a central receiving tank.

Such milk delivery pipe line, and the releaser work under vacuum supplied by a pump connected to said releaser by a conduit. In present installations any failure in the releaser may result in milk flowing through such conduit and fouling the vacuum pump, if not damaging it.

It is therefore the principal object of this invention to provide an automatic shut-off device operative to stop the motor, which drives the pump, in the event of milk flowing in the vacuum conduit between the releaser and said pump.

Another important object of the invention is to provide a shut-off device, as in the preceding paragraph, which is operative to baffle, and prevent milk flow, in such conduit beyond a predetermined point.

Thus, the effect of the device is to stop any surge of milk in the discharge conduit in the direction of the pump, and to shut off the pump drive motor in response to such flow or surge.

It is also an object of the invention to provide a shut-off, for continuous milking machines, which is designed for ease and economy of manufacture.

Still another object of the invention is to provide a practical and reliable shut-off, for continuous milking machines, and one which will be exceedingly effective for the purpose for which it is designed.

These objects are accomplished by means of such structure and relative arrangement of parts as will fully appear by a perusal of the following specification and claims.

In the drawings:

Fig. 2 is an enlarged side elevation of such device, partly broken away.

Fig. 3 is a transverse sectional elevation on line 3—3 of Fig. 2.

Fig. 4 is a cross sectional plan view on line 4—4 of Fig. 3.

Figure 1:
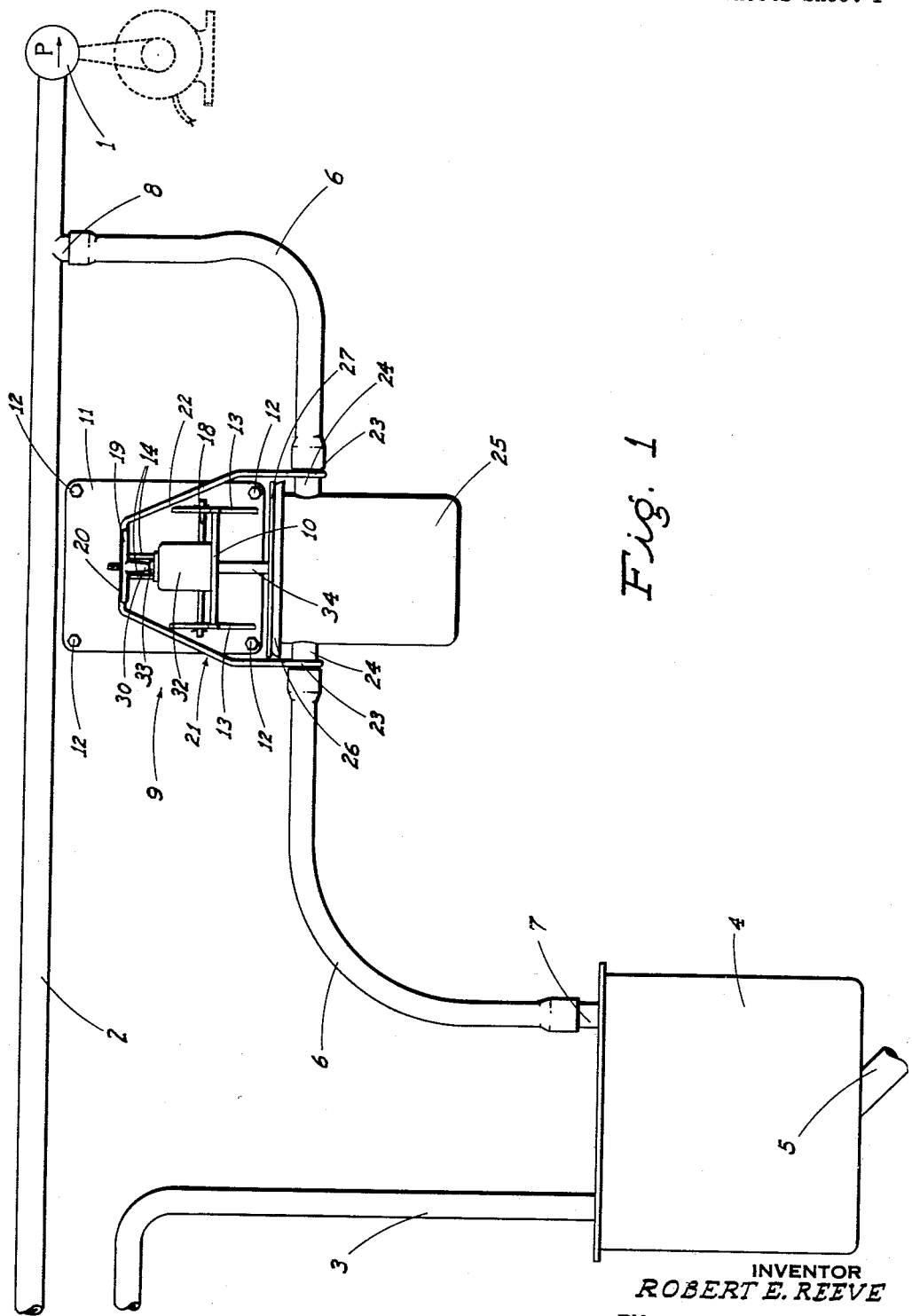
Fig. 1 is a front elevation of the shut-off device as mounted in connection with a continuous or pipe-line type milking machine.

Referring now more particularly to the characters of reference on the drawings, the present invention is adapted for use in connection with a continuous or pipe-line type milking machine which includes an electric motor-driven vacuum pump 1 connected to a vacuum pipe 2; the latter leading into the barn to supply vacuum to the pulsators of the milk transfer or pail units (not shown). Milk from such pail units returns from the barn in a milk delivery pipe 3 under vacuum; such pipe 3 discharging into a releaser 4 having a discharge pipe 5. The releaser 4 may be of the type shown in my co-pending application, Serial No. 231,201, filed June 12, 1951, now Patent No. 2,630,783, dated November 10, 1953.

The milk delivery pipe 3 and the releaser 4 are maintained under vacuum by a vacuum conduit, indicated at 6, and which is here shown as being a hose; such conduit 6 connecting at one end to the releaser 4 by a fitting 7 on the top of the latter, and at the other end by a fitting 8 to the vacuum pipe 2.

In the identified type of milking machine, if there is any failure or jamming of parts in the releaser 4 which would prevent the normal discharge of the milk from the pipe 5, there is the possibility of milk flowing in the vacuum conduit 6, entering the vacuum pipe 2, and ultimately reaching the pump 1, with undesirable effects.

The present invention provides a novel shut-off device, indicated at 9, interposed in the conduit 6 and effective to not only prevent milk flow beyond a predetermined point in such conduit, but also being operative to shut off the electric motor driven pump 1 upon occurrence of a surge of milk in such conduit 6.

The shut-off device 9 is constructed in the following manner:

A horizontal base plate 10 is rigidly fixed in connection with, and projects forwardly from, a back plate 11 attached by lag screws 12 or the like to a wall; the base plate 10 being reinforced by gusset plates 13 which extend forwardly from the back plate 11.

A post 14 upstands from the base plate 10 substantially centrally thereof, and a teeter beam 15 extends from front to rear above the base plate 10, being pivoted—intermediate its ends—as at 16, to the teeter beam 15.

An adjustable tension spring 17 connects between the rear end of the beam 15 and a cross rod 18 which spans between the gusset plates 13.

At its forward end the beam 15 is formed with a transverse cradle 19 which receives the top cross bar 20 of an inverted, generally U-shaped suspension yoke or bail, indicated generally at 21, which yoke includes legs 22 depending on opposite sides of the base plate and terminating some distance therebelow.

At their lower ends the yoke legs 2 are formed with loops or eyes 23 which receive tubular trunnions 24 projecting from adjacent the top and opposite sides of a pendant vessel or container 25. The tubular trunnions 24 are of such length that they project somewhat beyond the eyes 23; the flexible vacuum conduit or hose 6 being split, intermediate its ends, with the adjacent end portions coupled to corresponding ones of the tubular trunnions 24 in the manner shown in Fig. 1. As the conduit 6 is flexible, the container 25, suspended in the manner above described, is capable of downward yielding motion, against the tension of spring 17, from a normally raised position.

The container 25 is cylindrical, and at its upper edge is formed with an outturned rim 26 which serves as the seat for a circular cover 27 having a depending annular flange 28 which extends downwardly into the upper part of the container but terminates short of the tubular trunnions 24.

The cover 27 is fitted with a depending diametral baffle 29, and the cover 27 is disposed so that such baffle intersects the axis of the tubular trunnions 24 at right angles thereto; the baffle 29 being of a depth such that it extends into the container 25 a considerable distance below said tubular trunnions 24.

The teeter beam 15 is formed, at its forward end and directly below the cradle 19, with a rigid, downwardly projecting finger 30 which lies directly above the depressible "off" button 31 of an electric switch 32 of push-button type mounted on the base plate 10. The switch 32 also includes a depressible "on" button 33 disposed ahead of the "off" button 31. The switch 32 is connected in circuit, by an electric cord 34, with the electric motor-driven vacuum pump 1; such pump being thus shut off upon depression of the "off" button 31 of said switch 32.

The above described automatic shut-off device functions in the following manner:

The finger 30 is normally in a raised position under the influence of the tension spring 17 and when the container 25 is empty.

Upon a surge of milk flowing through the portion of the conduit 6 between releaser 4 and the device 9, such flow enters, and is trapped in, the container 25 through the releated tubular trunnion 24; passage of milk across the container and out through the other tubular trunnion 24 being prevented by the baffle 29.

As soon as any appreciable amount of milk is received in the container 25, it lowers under the weight of such milk and against the tension of spring 17, whereupon the teeter beam 15 is swung downwardly at the front due to the pull imposed thereon by the yoke 21 and container 25.

When this occurs, the downwardly projecting finger 30 depresses the "off" button 31, automatically shutting off the electric motor-driven vacuum pump 1, and thus effectively preventing access of milk to the latter.

After each shut-off operation of the device 9, the container 25 can be readily removed and emptied; this being accomplished merely by removing the yoke 21 from the cradle 19, and then detaching the cover 27.

The "on" button is manually depressed in order to reset the switch and start the pump.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A device to control the operation of an electric-motor driven pump connected to a conduit to create a flow therethrough; said device comprising, with such pump and an electric motor therefor, a container interposed in the conduit, the latter including flexible portions connected to the container so that the latter may have vertical movement, a mounting plate fixed above the container, a bail connected to and upstanding from the container, a switch mounted on the plate, the switch having on the top a depressible "off" button, depression of said button causing shut-off of the electric motor driven pump, a post upstanding from the plate adjacent the switch, a teeter beam pivoted intermediate its ends on the post, one end of the beam overhanging the "off" button, a finger depending from said one end of the beam in position to engage said button, a transverse cradle atop the same end of the beam, the bail being detachably carried at the top in the cradle, and spring means connected to the other end of the beam yieldably resisting downward motion of said one end of such beam.

2. A device to control the operation of an electric-motor driven pump connected to a conduit, said device comprising, with such pump and an electric motor therefor, a container, opposed trunnions on the container adjacent the top thereof, a fixed mount above the container, means detachably attached to said trunnions suspending the container from the mount for downward yielding movement from a normally raised position, a normally closed switch for the circuit of the motor mounted on the stand, and means to open the switch upon downward movement of the container; the trunnions being tubular and communicating with the interior of the container and the conduit including separated flexible portions between which the container is disposed and connected to the trunnions outwardly of the engagement of the suspension means therewith.

References Cited in the file of this patent
UNITED STATES PATENTS

| | | |
|---|---|---|
| 639,633 | Tufts et al. | Dec. 19, 1899 |
| 640,206 | Klein et al. | Jan. 2, 1900 |
| 868,464 | Mann | Oct. 15, 1907 |
| 1,129,334 | Cover | Feb. 23, 1915 |
| 1,236,413 | Droutlege | Aug. 14, 1917 |
| 1,559,315 | Daysh | Oct. 27, 1925 |
| 1,690,473 | Brown | Nov. 6, 1928 |
| 1,962,192 | Hapgood | June 12, 1934 |

FOREIGN PATENTS

| | | |
|---|---|---|
| 5,356 | Australia | Dec. 12, 1931 |
| 420,844 | Germany | Oct. 31, 1925 |